Patented Apr. 17, 1951

2,549,456

UNITED STATES PATENT OFFICE 2,549,456

MANUFACTURE OF GLUTAMIC ACID

William F. Gresham and Carl E. Schweitzer, Wilmington, Del., assignors to E. I. du Pont de Nemours & Company, Wilmington, Del., a corporation of Delaware No Drawing. Application April 5, 1948, Serial No. 19,184

2 Claims. (Cl. 260—534)

This invention relates to the synthesis of glutamic acid and related compounds. This application is a continuation-in-part of our copending application S. N. 5,512, filed January 30, 1948, which in turn is a division of our application S. N. 574,626, filed January 25, 1945, now abandoned.

Heretofore glutamic acid has been prepared by hydrolysis of proteins. It is believed that no commercially feasible method for the synthesis of glutamic acid from simple, readily available non-protein materials has been disclosed heretofore.

Numerous methods are known for converting glutamic acid hydrochloride to glutamic acid. For example this can be done by reacting the hydrochloride with an epoxide (U. S. 2,404,503), or by the use of a suitable quantity of sodium hydroxide, sodium carbonate or sodium bicarbonate (U. S. 2,405,474; cf. also U. S. 2,433,219, and U. S. 2,388,189). The glutamic acid hydrochloride employed in these processes, however, has been obtainable from proteins, or from costly laboratory syntheses, rather than from inexpensive, readily available, simple chemicals.

An object of this invention is to provide a commercially feasible process for the synthesis of glutamic acid. A further object of the invention is to provide a method for the preparation and hydrolysis of glutamic acid monoester nitriles from which high yields of glutamic acid can be obtained. A still further object is to provide an improved process for the synthesis and isolation of monosodium glutamate. Other objects appear hereinafter.

These objects of the invention are accomplished by preparing a glutamic acid monoester nitrile from the corresponding alpha-hydroxynitrile (the cyanhydrin of an ester of 4-oxobutyric acid) by treatment with an excess of ammonia (usually about 10 to 50 moles per mole of hydroxynitrile), usually at a temperature of about 50° C. to 150° C., preferably 50 to 100° C., under a pressure of at least 5 atmospheres, but more efficiently at a pressure of about 25 to 1000 atmospheres, and thereafter hydrolyzing the resulting glutamic acid monoester nitrile in an aqueous medium containing an alkaline-reacting or an acid-reacting hydrolytic agent. For rapid hydrolysis, elevated temperatures of about 75° to 125° C., may be employed. The hydrolysis may be conducted in an apparatus equipped with a reflux condenser or, alternatively, in a suitable autoclave when the hydrolysis is to be conducted under pressure. If desired, the glutamic acid thus produced can be isolated in the form of its monosodium salt, which is virtually insoluble in liquid ammonia.

The alpha-hydroxynitrile which is employed in the practice of this invention is the cyanhydrin of an alkyl 4-oxobutyrate. Methyl 4-oxobutyrate, as disclosed in applications S. N. 598,208 (now U. S. Patent 2,437,600), S. N. 758,984, filed July 3, 1947, and S. N. 5,512, filed January 30, 1948, can be prepared by a high pressure reaction between carbon monoxide, hydrogen and methyl acrylate. Other alkyl 4-oxobutyrates can be prepared in an analogous manner, and may be employed in the practice of this invention. These 4-oxobutyrates, upon reaction with HCN yield the desired cyanhydrins, which are novel compositions of matter. Upon reacting these cyanhydrins with ammonia, as herein described, glutamic acid monoester nitriles are obtained. In this amination it is desirable to avoid temperatures in excess of about 150° C., because at higher temperatures the —COO alkyl group in the monoester is converted in part to —CONH$_2$ by the action of the ammonia.

Any of the common alkalis or inorganic acids may be used as hydrolytic agents in the hydrolysis of these monoester nitriles, sodium hydroxide, phosphoric acid, sulfuric acid or hydrochloric acid being preferred. If desired, the amount of acid used may be from about 0.2 to about 10.0 equivalents or more per mole of glutamic monoester nitrile charged, although preferably at least 2.0 equivalent of acid is employed per mole of glutamic monoester nitrile. The optimum concentration of the acid depends on the nature of the acid employed. For example, excellent results are obtained with aqueous sulfuric acid containing about 30% to 50% by weight of H$_2$SO$_4$.

The invention is illustrated further by means of the following example.

*Example 1.*—Methyl 4-oxobutyrate,

(116 grams) containing 0.1% by weight of pyridine as catalyst is mixed with liquid hydrogen cyanide (54 grams), which is introduced gradually at a temperature of 40° to 50° C. over a period of 20 to 30 minutes. External cooling is required to prevent the temperature from rising above 50° C. After the exothermic reaction has ceased, the mixture is cooled to about 5° C., and is held at that temperature for about 0.5 to 1.0 hour. The mixture is then made slightly acid with 85% orthophosphoric acid, and the excess hydrogen cyanide is removed by evaporation under diminished pressure. A residue of methyl 4-cyano-4-hydroxybutyrate corresponding to 97%—98% yield, based upon the weight of methyl 4-oxobutyrate initially charged, is obtained. This product is contaminated with the pyridine-phosphoric acid salt and with a small quantity of free hydrogen cyanide.

(a) A portion of the above product (30 grams) without further purification, is heated under a pressure of about 40 to 60 atmospheres in a silver-lined shaker tube with 120 grams of ammonia (molar ratio of ammonia to cyanhydrin=34) at 60° for 1 hour. The product is thereafter withdrawn from the shaker tube and the excess ammonia is removed under diminished pressure, whereby a residue of glutamic acid monomethyl ester nitrile is produced. A suspension of this amination product in 50 cc. of cold water is prepared, and is mixed with 64 grams of cold concentrated hydrochloric acid. After the initial exothermic reaction has ceased (0.5 to 1.0 hour), the mixture is refluxed and stirred vigorously for four hours. Upon cooling the resulting reaction mixture a crystalline precipitate is formed. This is removed by filtration, after which additional crystals are obtained by concentrating the filtrate. This crystalline product is a mixture of glutamic acid hydrochloride and ammonium chloride. Pure glutamic acid hydrochloride is obtained by fractional crystallization of the product from aqueous hydrochloric acid (yield 82%, based upon the weight of methyl 4-oxobutyrate initially employed). Monosodium glutamate,

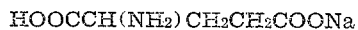
HOOCCH(NH$_2$)CH$_2$CH$_2$COONa is obtained from the hydrochloride by reaction with two molar equivalents of aqueous sodium hydroxide, drying the resulting mixture, and leaching out the NaCl formed with liquid ammonia.

(b) An amination product (30 grams), prepared as described in Example 1 (a) is suspended in 50 cc. of water, and is added rapidly (5 to 6 minutes) to a boiling, vigorously stirred, solution containing 16.3 grams (ca. 2 moles, per mole of glutamic acid monomethyl ester nitrile) of sodium hydroxide in 32 cc. of water, and the mixture is refluxed for an additional 30 minutes. The resulting product is concentrated to dryness by evaporation of water under reduced pressure, whereby a white crystalline residue is obtained. This residue is washed several times with methanol and thereafter dried in an oven at 120° C. The product thus obtained is disodium glutamate,

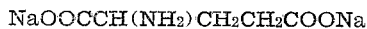
NaOOCCH(NH$_2$)CH$_2$CH$_2$COONa which is obtained in 80% yield based upon the weight of methyl 4-oxo-butyrate initially employed. Monosodium glutamate is obtained in nearly quantitative yield from this disodium salt by half-neutralization with HCl, drying, and leaching out the sodium chloride formed with liquid ammonia.

This invention is not limited to the illustrative example given above, since many different embodiments will occur to those skilled in the art. Any of the known methods for converting glutamic acid hydrochloride, or other glutamic acid salts to glutamic acid may be used if glutamic acid, as such, is desired. In general, the amino-acid may be isolated as such or in the form of a salt, amide, or other simple derivative. The monosodium salt, which is readily obtained by partial neutralization, is of value as a food flavoring agent. Thus the process of this invention may be employed for the manufacture of dl-glutamic acid, and salts thereof, which compounds are useful in the artificial flavor, and animal feed, industries.

We claim:

1. In the manufacture of monosodium glutamate the process which comprises reacting the cyanhydrin of methyl 4-oxobutyrate with ammonia at a reaction temperature not in excess of 150° C., under a pressure of at least 5 atmospheres, whereby glutamic acid monomethyl ester nitrile is produced, removing excess ammonia from the resulting mixture, subjecting the residue to hydrolysis with aqueous sodium hydroxide, the quantity of sodium hydroxide being stoichiometrically sufficient to form disodium glutamate, evaporating the resulting mixture to dryness, whereby a residue of disodium glutamate is obtained, admixing the said residue with sufficient hydrochloric acid to convert the disodium to monosodium glutamate, and drying the resulting mixture containing monosodium glutamate.

2. In the manufacture of monosodium glutamate the process which comprises reacting the cyanhydrin of methyl 4-oxobutyrate with ammonia at a reaction temperature not in excess of 150° C., under a pressure of at least 5 atmospheres, whereby glutamic acid monomethyl ester nitrile is produced, removing excess ammonia from the resulting mixture, subjecting the residue to hydrolysis with aqueous sodium hydroxide, the quantity of sodium hydroxide being stoichiometrically sufficient to form disodium glutamate, evaporating the resulting mixture to dryness, whereby a residue of disodium glutamate is obtained, admixing the said residue with sufficient hydrochloric acid to convert the disodium glutamate to monosodium glutamate, drying the resulting mixture containing monosodium glutamate, and leaching sodium chloride therefrom with liquid ammonia, whereby a residue of monosodium glutamate is obtained.

WILLIAM F. GRESHAM.
CARL E. SCHWEITZER.

REFERENCES CITED

The following references are of record in the file of this patent:

UNITED STATES PATENTS

| Number | Name | Date |
|---|---|---|
| 2,437,600 | Gresham et al. | Mar. 9, 1948 |

OTHER REFERENCES

Keimatsu et al., Chemical Abstracts, vol. 20, page 2824 (1926).

Barger et al., Biochem. J., vol. 22, pages 1420–1422 (1928).

Taylor et al., Sidgwick's Organic Chemistry of Nitrogen, page 117 (1937).

Stoll et al., Chem. Abstracts, vol. 33, col. 1667 (1939).

Block, Chemical Reviews, vol. 38, pp. 523–526 (1946).